United States Patent [19]

Suutarinen

[11] Patent Number: 4,957,633
[45] Date of Patent: Sep. 18, 1990

[54] FLOATATION CLARIFYING AND FLOCCULATING/PURIFICATION OF LIQUID

[76] Inventor: Oiva Suutarinen, Rysäkuja 5, 02260 Espoo, Finland

[21] Appl. No.: 307,732

[22] Filed: Feb. 7, 1989

[51] Int. Cl.⁵ .............................. B03D 1/00; C02F 1/24
[52] U.S. Cl. .................................... 210/705; 210/726; 210/738
[58] Field of Search ............... 210/703, 704, 706, 726, 210/776, 800, 205, 221.2, 715, 705, 738

[56] References Cited

U.S. PATENT DOCUMENTS

| 3,710,941 | 1/1973 | Brociner | 210/776 |
| 3,764,013 | 10/1973 | Eisenmann | 210/705 |
| 4,055,494 | 10/1977 | Emmett, Jr. | 210/715 |

FOREIGN PATENT DOCUMENTS

| 570802 | 9/1958 | Belgium | 210/221.2 |
| 8671294 | 9/1986 | Finland . | |
| 8801054 | 9/1988 | Finland . | |
| 50-35956 | 8/1973 | Japan | 210/703 |

Primary Examiner—Peter Hruskoci
Assistant Examiner—Krisanne Shideler
Attorney, Agent, or Firm—Steinberg & Raskin

[57] ABSTRACT

The present invention concerns a floatation clarifying/flocculating procedure for purifying liquid, in which particles of impurities present in a liquid to be purified or impurities dissolved in the liquid which have been converted into particle form with the aid of flocculating chemicals, are separated from the liquid to be purified and carried to the surface of the liquid, to form thereon a sludge bed. The sludge bed is conducted out through a sludge trough to a sewer or equivalent, and flocculating chemicals are then added to the remaining liquid thus already at least partially purified, so that the chemicals form dirt particles with the impurities still present in a dissolved state but which have not yet been removed from the remaining liquid. The liquid or water flocculated in this manner is conducted out through a discharge aperture and towards and additional clarifying procedure in which the dirt particles are separated and the thus-purified liquid can be taken into use or conducted back into the environment as regarding, e.g., residual waters. Floatation clarifying and flocculating are performed in the same floatation clarifying/flocculating basin. The present invention is also directed to the device for carrying out this floatation clarifying/flocculating in a single basin.

5 Claims, 2 Drawing Sheets

FLOATATION CLARIFYING AND FLOCCULATING/PURIFICATION OF LIQUID

BACKGROUND OF THE INVENTION

The present invention concerns a procedure for purifying liquid of solid and dissolved impurities by floatation clarifying/flocculating in which the dirt particles present in a liquid to be purified, along with other separable impurities or impurities dissolved in the liquid and which have been converted into particle form with the aid of a flocculating chemical, are separated from the liquid to be purified and carried to the surface of the liquid to become or form a sludge bed. This sludge bed is conducted to a sludge removal line and then further to a sewer or the equivalent. Flocculating chemicals are added to the liquid thus-purified, through a chemical feeding pipe, whereby the chemicals become mixed with the liquid that requires additional purification and form new particles with the impurities still present in dissolved state in the liquid but which have not yet been removed, in a lower part of a basin. Then, the flocculated liquid is conducted out through a discharge aperture and to further separation. The present invention is also directed to a device for purifying liquid of solid and dissolved impurities by floatation clarifying/flocculating. The floatation method has been used to separate solid particles from liquid for over a hundred years.

With the aid of this method, particles can be caused to rise up and float upon a surface of the liquid, from which the particles can easily be removed and the purified liquid or water then conducted off from underneath.

The surface of the earth comprises a great deal of marshland which could ultimately become the source of usable or drinking water for the population at large. For example, Finland is one of the countries with the largest amount of marshland in the world. The surface waters, lake waters, as well as river waters, in general contain great quantities of organic substances, such as so-called humus generated by flora. Additionally, such water often contains solid substances, such as clay and mud, which make the water muddy. These impurities and contaminants have to be removed from such water, in order to make the same drinkable or usable.

In official regulations promulgated by authorities, rates have been specifically prescribed on what the raw water content should be to be used, so that the water could be used as a raw water source for drinking and household water. However, it is to be noted that such rates have generally been promulgated only recently. Therefore, town and village centers which have already been constructed before such prescriptions on drinking water quality do not frequently have the necessary resources to utilize such water as required in these rates or regulations for providing household water, because such water would not then be available economically.

Additionally, accurate standards have been set forth for the household water to be purified and distributed, such standards having been tightened as the purification methods for water or liquid have become more developed. Water concerning various purification results must meet such standards, before such water is suitable for use. On the other hand, these standards impose additional requirements for the purification processes, so that such purification standards must be reached when using the raw water available.

The flakes or flocs to be produced in the purification process, due to the impurities and with the aid of various chemicals added into the raw water, such flocs containing humus and particles of impurities and requiring removal in the purification process, become very light because of the quality in the raw water, and thus the deposition of such flakes or flocs is slow. Therefore, the horizontal and vertical clarifying procedures which have previously been used exclusively, e.g. in Finland, have been eliminated from use when new purification installations have been constructed, since such processes require a lot of space and large basins for the operation thereof. A so-called floatation method has replaced such procedures, in which flocs are raised to the surface during the purification process with the aid of minute, less than 80 micron air bubbles contained in a water/air solution which is added into the liquid or water. The dirt is removed from the surface and the purified water is conducted away from the bottom, in contrast to the previously-utilized methods.

With the floatation method, great savings are achieved in volume, and therefore also in construction costs, machinery and piping systems. Furthermore, better purification systems have been obtained. Therefore, the floatation method has superseded earlier methods, and is already presently considered to have a remarkable economic significance. It is also extremely useful in enhancing the efficiency of old installations and in improving the quality of the purified water, even without external additional structures.

Often, the raw material to be purified is poor in quality and contains such substances to be eliminated for which one kind of chemical is not alone adequate to solve the problem by being used only once. Furthermore, it may be necessary to use a number of different chemicals such as chemicals containing iron or aluminum which do not perform best when simultaneously used, but do so at different times because the respective reactions take place best at varying pH rates. Therefore, such water requires at least two successive purifications.

The description presented above also concerns purification of residual waters in which good results ar also achieved using the same floatation methods as in purifying household water, but which are now applied for residual waters. The majority of residual water is of such quality that a great part of the impurities can be removed without having to use any chemicals, even exclusively with the floatation method. By purifying the water treated in such a manner again with the aid of chemicals, extremely good results are achieved, for instance in purifying inhabitation residues, residues of the cellulose and paper industries, the paint industry, the pharmaceutical industry, and the food industry, etc. In particular, it can be noted that the majority of solids can be removed in this manner, specifically oil and fatty substances which otherwise considerably interfere with the subsequent purification processes.

Additionally, a plurality of chemicals are also saved and other purifying processing sectors can be made to operate more efficiently. Therefore, the purifying results also become significantly improved, and in addition, savings are achieved in compacting and transporting the sludge away. Furthermore, savings are attained in costs related to water/air solution, equipment, production, distribution, and pumping, which are required in the floatation process because less sludge is formed.

SUMMARY OF THE INVENTION

Accordingly, it is an object of the present invention to improve the purification techniques of liquid, notably water, so that the same can meet the appropriate standards of quality.

This and other objects ar specifically attained by the present invention which is directed to a method for purifying liquid of solid and dissolved impurities, comprising the steps of forming on top of the liquid in a basin, a sludge bed of particles containing impurities, conducting the thus-formed sludge bed on top of the liquid out of the basin, adding at least one flocculating chemical into the basin whereby the chemical becomes mixed with the remaining liquid and forms particles with impurities not removed with the sludge bed in a lower part of the same basin and thus-flocculating the remaining liquid, and conducting the thus-flocculated remaining liquid out from the basin, whereby the steps of forming the sludge bed and flocculating the remaining liquid are all carried out in the same basin.

Initially, a flocculating chemical may be added to the liquid to form particles of impurities prior to the step of forming the sludge bed on top of the liquid, while the thus formed sludge bed on top of the remaining liquid may be conducted into a sludge removal trough situated in the basin, prior to the step of removing the thus formed sludge bed out from the basin. The thus formed sludge bed is preferably conducted into a sewer from the basin, while the thus flocculated remaining liquid is conducted out of the basin through a flow aperture situated in the lower part thereof. Additionally, the thus flocculated liquid may be conducted to additional separation treatment after removal from the basin itself.

The present invention is also directed to a device for purifying a liquid of solid and dissolved impurities by floatation clarifying/flocculating, which comprises a basin, a partition wall extending upwardly along one side of the basin and defining an ascending channel therein, a sludge trough extending along an upper part of the basin, an inlet for incoming liquid at a lower end of the ascending channel, means for introducing treatment chemical into a lower part of the basin, and an outlet for flocculated liquid at a lower end of said basin, whereby the floatation clarifying and flocculating are all performed in a single basin.

The procedure of the present invention is characterized by the floatation clarifying and flocculating all being performed in the same floatation clarifying/flocculating basin.

Therefore, the present invention concerns a floatation clarifying/flocculating method in which the floatation clarifying and the formation of flakes, i.e., the so-called flocculation, take place in the same unit so that the floatation clarifying takes place in an upper part of the basin and the flocculating takes place in a lower part of the basin.

The present invention can be equally combined with a subsequent floatation, vertical or horizontal clarifying, or floatation filtration as well as with flocculation performed previously or with the above-noted processing sections connected therebefore or thereafter, to be consonant with purification need of each liquid in each particular case.

When the procedure of the present invention is utilized in these types of purification processes, savings are furthermore gained in addition to the savings noted above, substantially in building capacity and in flow through runs because the lower part required in the floatation clarifying process can be utilized as a flocculating volume.

BRIEF DESCRIPTION OF THE DRAWINGS

The present invention will now be described in greater detail below with reference to a number of advantageous embodiments illustrated in the accompanying drawings and to which, however, the present invention is not intended to be exclusively confined. In the drawings.

DESCRIPTION OF THE PREFERRED EMBODIMENTS

Figure 1:
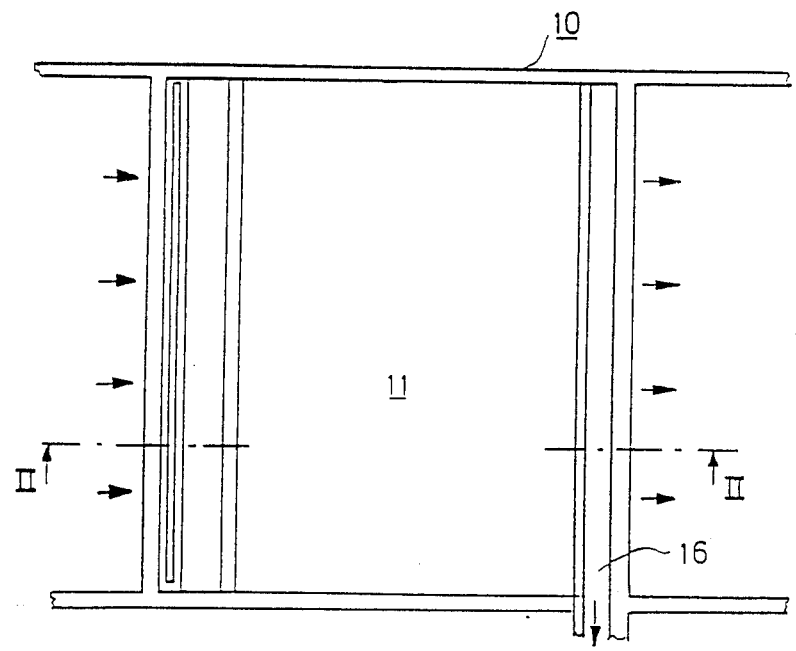
FIG. 1 is a top view of an advantageous embodiment of the floatation clarifying/flocculating procedure of the present invention.
Figure 2:
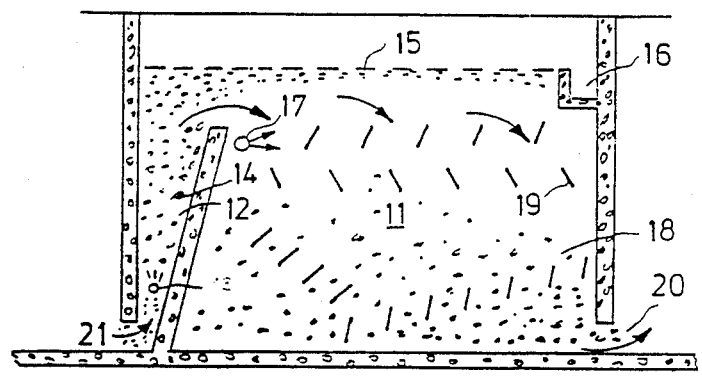
FIG. 2 is a sectional view along line II—II of FIG. 1.

In the form presented in FIGS. 1 and 2, the floatation clarifying/flocculating installation is generally denoted by reference numeral 10. The installation 10 comprises a clarifying/flocculating basin 11 and equipment disposed therein. In the same basin, both floatation/clarifying and flocculating are performed. The installation 10 furthermore comprises an entrance aperture 21 through which the liquid to be purified and in which impurities are present already at least partially in particle form, or containing other substances which can be separated out of the liquid, flows through the inlet aperture 21 and into an ascending channel 12. Therein, a water/air mixture is added to the liquid to be purified through a distribution pipe 13. The air contained by the water/air mixture is caused to be distributed substantially across the entire width of the basin 11 through the distribution pipe 13 in the form of microscopically minute air bubbles. Such air bubbles adhere to dirt particles 14 in the ascending channel 12 or to fat or oil 14 contained, e.g., in a liquid, carrying the particles to the surface of the liquid to be purified where the particles become spread all over substantially the entire surface area of the basin 11.

When gathered thereon, these particles form a sludge bed 15 which is preferably removed at given intervals into a sludge trough 16, and therefrom onwardly, for instance, into a sewer. Flocculating chemicals are thereafter added through a chemical supply pipe 17 all over substantially the entire width of the basin 11 to the liquid which has been freed from the dirt thus removed in the sludge trough 16, whereby the added chemicals become mixed with the liquid requiring additional purification. The clarifying process taking place in an upper part of the lower area of the basin volume 11, takes place with the aid of chemicals and with flake formation, i.e., flocculation 18 of the impurities still present in dissolved state in the liquid and which have not been removed in the clarifying section. For enhancing this operation and for providing uniform flow in the entire basin area, and also intensifying the clarifying process in this manner, it is extremely advantageous to provide the flocculating space with apparatus 19 which will aid in flocculating and in balancing the flow. For such purposes, e.g., the flocculation basin design disclosed in Finnish Patent No. 71,294 is an extremely suitable design. The flocculated liquid is conducted through an outflow aperture 20, and further to an additional clarifying process or to a floatation/clarifying filter process.

Figure 3:
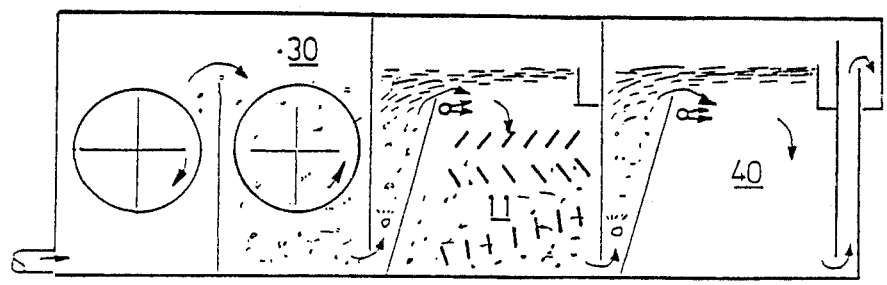
FIG. 3 is a sectional view similar to FIG. 2 and illustrating a second advantageous embodiment of the floatation clarifying/flocculating procedure of the present invention.

In the embodiment shown in FIG. 3, the liquid to be purified and to which flocculating chemicals are added, is conducted to a flake formation, i.e. stirring space 30 to form dirt particles or flocs, before being conducted into the floatation clarifying/flocculating basin 11. In this embodiment, the floatation clarifying/flocculating basin 11 is followed by a floatation clarifying process 40, as illustrated in FIG. 3.

Figure 4:
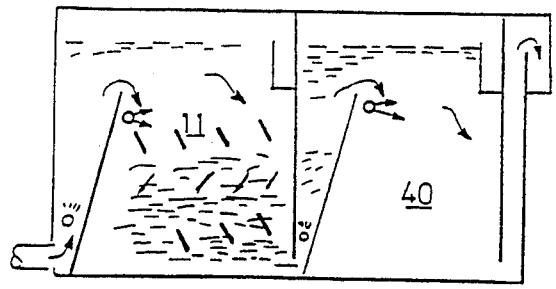
FIG. 4 is a sectional view similar to FIG. 2 and illustrating a third advantageous embodiment of the floatation clarifying/flocculating procedure of the present invention.

In the embodiment illustrated in FIG. 4, the flocculated liquid is conducted from the floatation clarifying/flocculating basin 11 to the floatation clarifying process 40.

Figure 5:
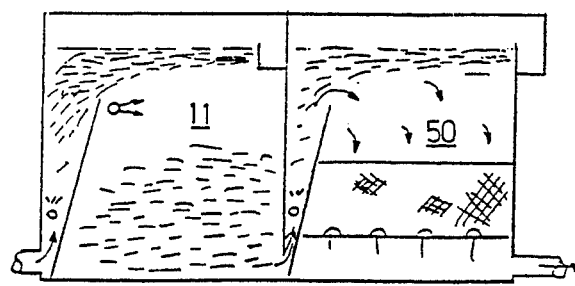
FIG. 5 is a sectional view similar to FIG. 2 and illustrating a fourth advantageous embodiment of the floatation clarifying/flocculating procedure of the present invention.

In the embodiment illustrated in FIG. 5, the flocculated liquid is conducted from the floatation clarifying/flocculating basin 11 into a floatation filtering process 50.

The procedure of the present invention is naturally not in any way restricted to the designs presented in the drawings herein, so that the procedure of the present invention can be applied to basins of various designs, and also to prior installations and to the basins therein, for organizing the various flows in a different manner. Accordingly, the preceding description of the present invention is merely exemplary, and is not intended to limit the scope thereof in any way.

What is claimed is:

1. Method for purifying liquid of solid and dissolved impurities, comprising the steps of
    forming on top of the liquid in a basin, a sludge bed of particles containing impurities,
    conducting the thus-formed sludge bed on top of the liquid out of the basin,
    adding at least one flocculating chemical into said basin whereby said chemical becomes mixed with the remaining liquid and forms particles with impurities not removed with the sludge bed, in a lower part of the same basin, and thus flocculating said remaining liquid, and
    conducting said thus-flocculated remaining liquid out from said basin,
    whereby said steps of forming the sludge bed, and flocculating the remaining liquid are all carried out in the same basin,
    wherein said thus-flocculated remaining liquid is conducted out of said basin through a flow aperture situated in the lower part thereof and
    comprising the additional step of
    conducting said thus-flocculated remaining liquid to additional separation treatment after removal from said basin and further comprising the additional step of introducing a water/air mixture through a distribution pipe into the liquid combining the solid and dissolved impurities as said liquid rises in an ascending channel into said basin,
    whereby the air contained in said water/air mixture is distributed substantially across an entire width of said basin in the form of minute air bubbles which adhere to the impurity particles in the liquid to which liquid an initial flocculating chemical has been added to form particles of impurities and carry the same to the top surface of the liquid, thereby enhancing said formation of the sludge bed on top of the liquid and
    comprising the additional step of
    enhancing said flocculating of the liquid in said basin and providing uniform flow of said liquid in the entire basin area by employing apparatus for enhancing said flocculating and providing uniform flow within said basin and wherein said at least one flocculating chemical is added into said liquid through a chemical supply pipe situated over substantially an entire width of said basin.

2. The method of claim 1, comprising the additional step of
    conducting said thus-formed sludge bed on top of the liquid into a sludge removal trough situated in said basin, prior to the step of removing said thus-formed sludge bed out from said basin.

3. The method of claim 2, wherein said thus-formed sludge bed is conducted into a sewer from said basin.

4. The method of claim 1, comprising the additional step of
    conducting the initially-flocculated liquid through an inlet aperture and into said ascending channel in said basin, and up over a partition wall in said basin,
    whereby said sludge bed is formed upon said liquid after the same flows up and over said partition wall.

5. The method of claim 1, comprising the additional step of
    conducting the liquid into a flake-forming or stirring space for forming the impurity particles or flocs, after addition of said initial flocculating chemical and before introducing the liquid into said basin.

* * * * *